United States Patent
Wu

(10) Patent No.: US 10,163,323 B1
(45) Date of Patent: Dec. 25, 2018

(54) SWIMMING POOL SAFETY SURVEILLANCE SYSTEM

(71) Applicant: NATIONAL CHIN-YI UNIVERSITY OF TECHNOLOGY, Taichung (TW)

(72) Inventor: Shih Kuang Wu, Taichung (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 0 days.

(21) Appl. No.: 15/896,349

(22) Filed: Feb. 14, 2018

(51) Int. Cl.
 *G08B 21/08* (2006.01)
 *G06K 9/00* (2006.01)
 *G08B 25/10* (2006.01)

(52) U.S. Cl.
 CPC ....... *G08B 21/086* (2013.01); *G06K 9/00288* (2013.01); *G06K 9/00771* (2013.01); *G08B 25/10* (2013.01)

(58) Field of Classification Search
 CPC .. G08B 21/086; G08B 25/10; G06K 9/00288; G06K 9/00771
 See application file for complete search history.

(56) References Cited

U.S. PATENT DOCUMENTS

| | | | | |
|---|---|---|---|---|
| 7,839,291 B1* | 11/2010 | Richards | ............ | G08B 21/086 340/553 |
| 2009/0303055 A1* | 12/2009 | Anderson | ............ | G08B 21/086 340/573.6 |
| 2015/0107015 A1* | 4/2015 | Ng | ............ | E04H 4/06 4/504 |
| 2015/0262024 A1* | 9/2015 | Braithwaite | ....... | G06K 9/00255 382/118 |
| 2016/0012700 A1* | 1/2016 | Matko | ............ | G08B 21/086 340/573.6 |
| 2017/0167151 A1* | 6/2017 | Segal | ............ | B63C 9/02 |
| 2017/0235308 A1* | 8/2017 | Gordon | ............ | G05D 1/0088 701/2 |
| 2017/0365150 A1* | 12/2017 | Bennett | ............ | A01D 34/008 |
| 2018/0040223 A1* | 2/2018 | Bodi | ............ | G08B 21/0415 |

* cited by examiner

*Primary Examiner* — Joseph H Feild
*Assistant Examiner* — Rufus C Point
(74) *Attorney, Agent, or Firm* — Muncy, Geissler, Olds & Lowe, P.C.

(57) ABSTRACT

A swimming pool safety surveillance system includes a camera identifying module, a terminal controller, and a camera identification monitoring module. The camera identifying module identifies the face of swimmers to generate a face information. The camera identification monitoring module tracks the face information around the facility environment of the swimming pool area, so as to produce a warning signal when the swimmer with corresponding face information is in an accident event, such that the emergency signal is sent to the terminal controller for sending a rescue warning. By intelligently tracking the face of swimmers, the swimming pool environment is under safety surveillance, whereby the rescue operation is immediately carried out for accident occurrence, and the swimming pool safety and the rescue efficiency are improved.

14 Claims, 5 Drawing Sheets

SWIMMING POOL SAFETY SURVEILLANCE SYSTEM

BACKGROUND OF THE INVENTION

1. Field of the Invention

The present invention relates to safety surveillance, and more particularly, to a swimming pool safety surveillance system.

2. Description of the Related Art

For preventing drowning events from occurring, lifeguards are often hired for a normal swimming pool. However, due to a large amount of swimmers, lifeguards are incapable of watching over every one of the swimmers. Also, when swimmers are not able to save themselves due to the panic upon drowning or when there are no lifeguards able to provide rescue immediately, lifeguards are not able to recognize drowning events or the position of drowning swimmers. Therefore, the time point for rescuing the drowning swimmers is easily delayed.

Further, dangerous accidents occur more easily upon children, elders, and the disables in the swimming pool than upon teenagers and adults. Therefore, swimming pool lifeguards need to pay more attention on the activity of such special swimmers.

However, when the swimmers enter the swimming pool area, the swimmers are free to act in the swimming pool area. The lifeguards are only able to identify such special swimmers according to the appearance of the swimmers, such that the lifeguards are unable to completely and accurately identify all the special swimmers. As a result, accidents such as slipping and falling or drowning easily occur, causing hidden safety risk.

SUMMARY OF THE INVENTION

For improving the issues above, a swimming pool safety surveillance system is disclosed. With intelligent face identifying and tracking method, the swimming pool area is under surveillance. When an accident occurs, a rescue warning is immediately sent out, so as to increase the swimming pool safety and rescue efficiency.

A swimming pool safety surveillance system in accordance with an embodiment of the present invention is provided, comprising:

a camera identifying module disposed at a swimming pool area for detecting a face of a swimmer and generating a corresponding face information;

a terminal controller coupled with the camera identifying module for storing the face information; and a camera identification monitoring module coupled with the terminal controller and disposed around a facility environment of the swimming pool area for tracking the face information, wherein when the swimmer corresponding to the face information is in an accident event, the camera identification monitoring module generates an emergency signal which is sent to the terminal controller, such that the terminal controller sends out a rescue warning.

With such configuration, by recording the face information through the camera identification monitoring module, the camera identification monitoring module tracks the face information of the swimmers. When the swimmer corresponding to the face information is in an accident event, the terminal controller is allowed to send out the rescue warning immediately, thereby improving the inconvenience of monitoring all swimmers by the lifeguards, enhancing the rescue efficiency, and increasing the swimming pool safety.

In an embodiment of the present invention, the camera identification monitoring module is provided with a positioning unit, which generates a location information corresponding to the emergency signal. The positioning unit sends the location information to the terminal controller. The rescue warning includes the location information and the face information of the swimmer in the accident event. Therefore, the disadvantage of delayed rescue time point due to incapability of recognizing the location of drowning swimmer or accident is resolved. Thus, the present invention is able to provide the rescue-needing location through the positioning unit, so as to efficiently recognize the location of the drowning swimmer, improving the rescue efficiency.

In an embodiment of the present invention, the terminal controller is provided with a membership module for recording the face information and establishing a member data. The membership module includes a special membership unit for recording the face information and member data corresponding to children, elders, and the disables. The special membership unit records the disability categories of the special members in the member data. The camera identification monitoring module reads and tracks the face information in the special membership unit. The camera identification monitoring module identifies if the swimmers are in a dangerous situation according to the member data corresponding to the face information of the special membership unit. With such configuration, the camera identification monitoring module specifically tracks the face information stored in the special membership unit, so as to emphasize the safety surveillance upon special swimmers and accurately identify if the special swimmers are in a dangerous situation according to various statuses of special swimmers. Therefore, disadvantage of conventional lifeguards incapable of accurately identifying and recognizing the activity of special swimmers is resolved, so as to reduce the accident occurring rate.

In an embodiment of the present invention, an environment monitoring module is further included, which is coupled with the terminal controller and disposed in the swimming pool of the swimming pool area for detecting a liquid quality information inside the swimming pool. The environment monitoring module sends the liquid quality information to the terminal controller, wherein the terminal controller includes an environment recording module, and the liquid quality information is recorded in the environment recording module. The environment recording module stores a warning scope value. When the liquid quality information exceeds beyond the warning scope value, a notification signal is sent out. Therefore, the liquid quality in the swimming pool is under control, so as to reduce the possible damage caused by the low quality liquid upon the swimmers, thereby improving the quality of the swimming pool.

DETAILED DESCRIPTION OF THE INVENTION

Figure 1:
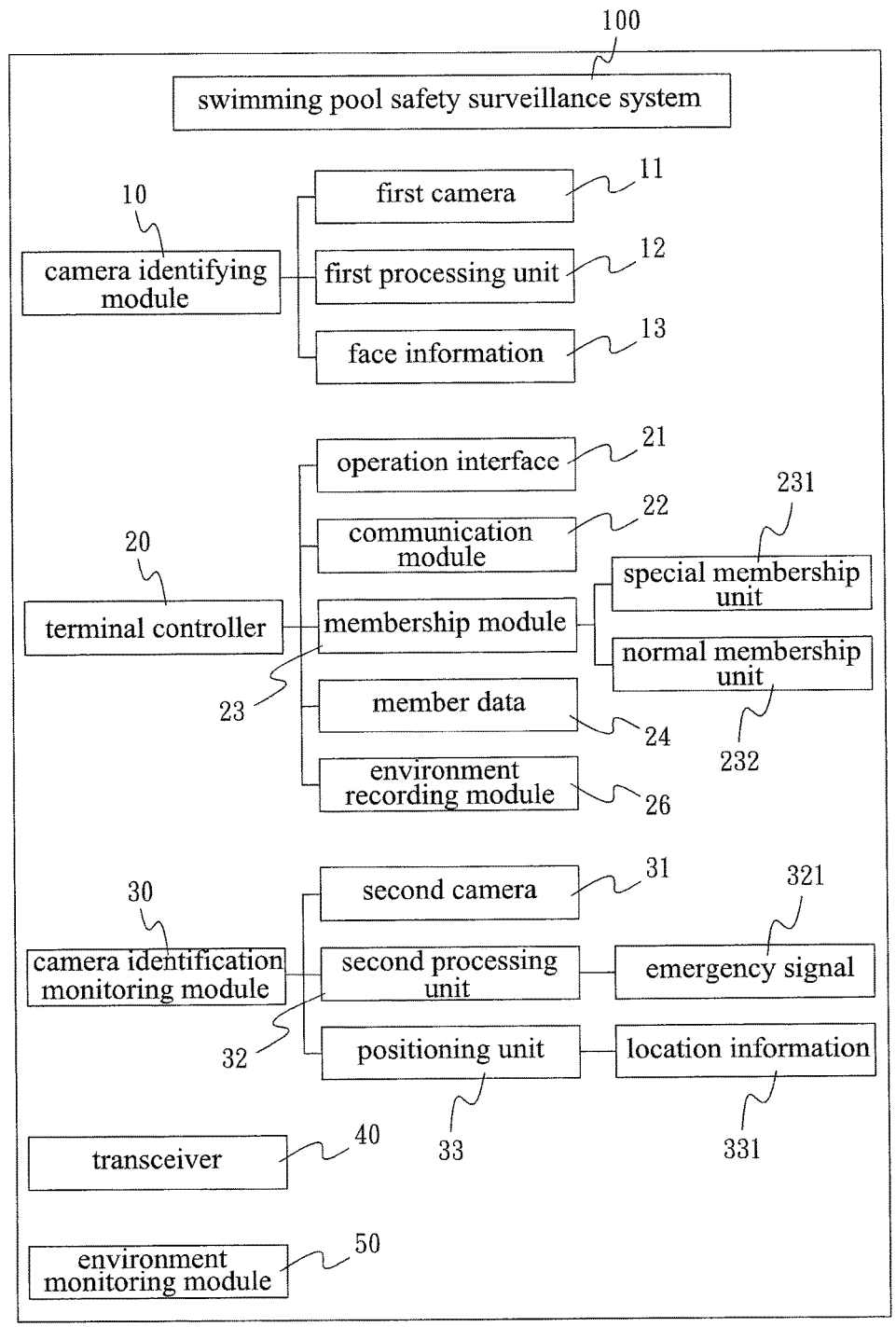
FIG. 1 is a block diagram illustrating the structural connection of the system in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 5, a swimming pool safety surveillance system 100 in accordance with an embodiment of the present invention is provided, which is disposed at a swimming pool area 1. The swimming pool area 1 includes an entrance 2, an entrance counter 3, a facility environment 4, and a swimming pool 5, wherein the facility environment 4 of the swimming pool area 1 further includes the aisles around the swimming pool 5, aisles between each facility, sauna facility, steam sauna chamber facility, medicated bath facility and other facilities.

The swimming pool safety surveillance system 100 includes a camera identifying module 10, a terminal controller 20, and a camera identification monitoring module 30.

The camera identifying module 10 is disposed at the entrance counter 3 of the swimming pool area 1 and provided with a first camera 11 and a first processing unit 12. The first processing unit 12 is able to carry out image processing analysis. The first camera 11 faces toward the entrance 2 of the swimming pool area 1. When a swimmer 6 enters from the entrance 2 of the swimming pool area 1, the first camera 11 captures the face of the swimmer 6, and the first processing unit 12 analyzes the face of the swimmer 6 to generate a corresponding face information 13.

The terminal controller 20 is coupled with an operation interface 21 and the camera identifying module 10. The operation interface 21 is able to display the face information 13 or edit the data of the face information 13. The terminal controller 20 is allowed to be a mobile device, such as a tablet or smartphone, or a non-mobile device, such as a personal computer. When the terminal controller 20 is not a mobile device, the operation interface 21 includes a computer monitor, mouse, and keyboard. When the terminal controller 20 is a mobile device, the operation interface 21 refers to a touch panel. Also, the terminal controller 20 includes a communication module 22 for transmitting the data or signal.

Figure 3:
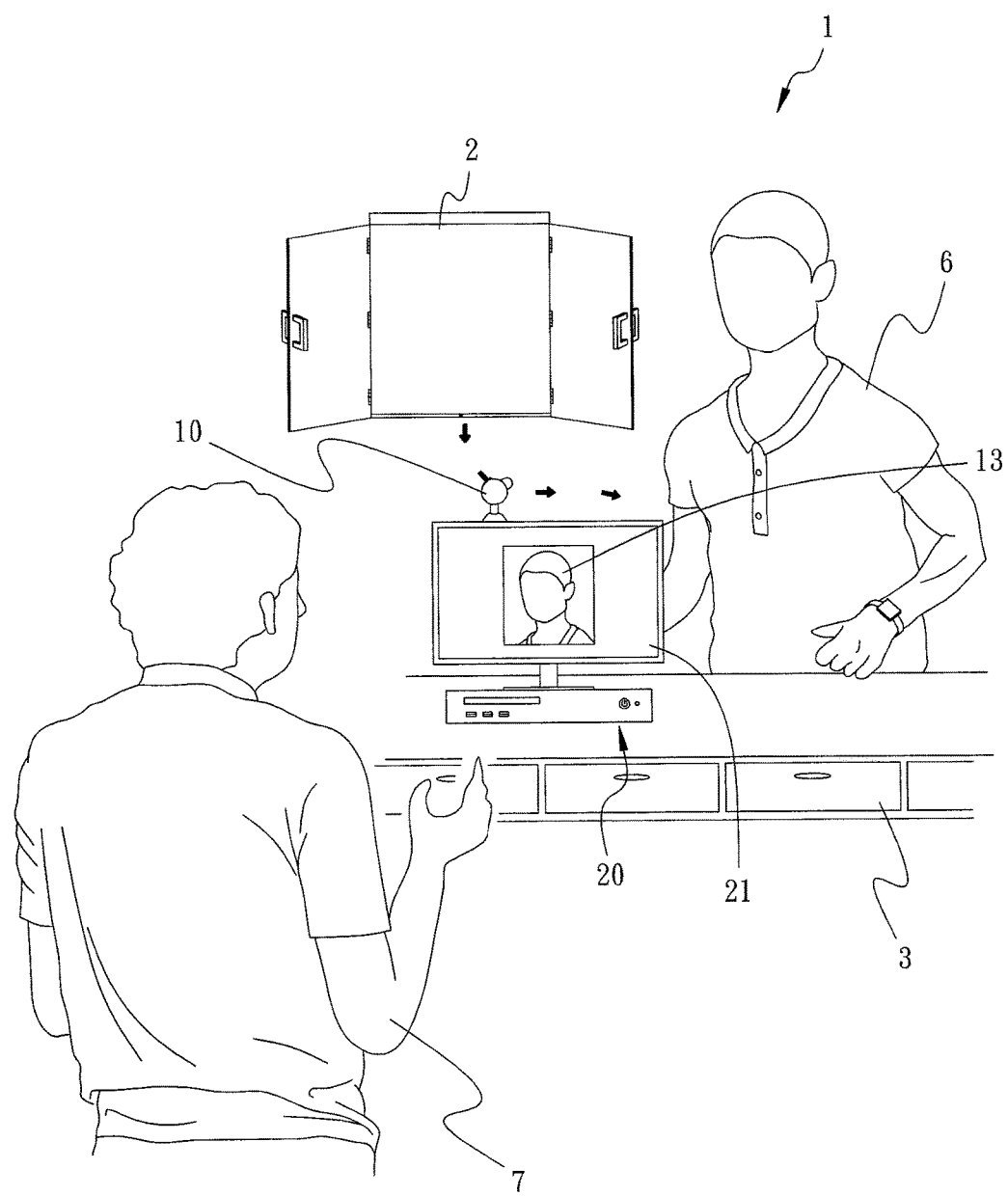
FIG. 3 is a schematic view illustrating the application of the camera identifying module of the system.

The terminal controller 20, the camera identifying module 10, and the operation interface 21 are coupled in a cable connection or wireless connection manner. The terminal controller 20 is allowed to be disposed in the apparatus room or at the entrance counter 3 of the swimming pool area 1. In an embodiment of the present invention, the terminal controller 20, the camera identifying module 10, and the operation interface 21 are wirelessly coupled; also the terminal controller 20 and the operation interface 21 are disposed at the entrance counter 3 of the swimming pool area 1, as shown by FIG. 3.

Further, the terminal controller 20 includes a membership module 23, which stores the face information 13 and the member data 24 established corresponding to the face information 13. More specifically, in an embodiment of the present invention, when the camera identifying module 10 sends the face information 13 to the terminal controller 20, the operation interface 21 is able to display the face information 13, and the keeper 7 at the entrance counter 3 of the swimming pool area 1 is able to establish the member data 24 corresponding to the face information 13 through the operation interface 21, as shown by FIG. 1 and FIG. 3.

The membership module 23 includes a special membership unit 231 and a normal membership unit 232. The special membership unit 231 records the face information 13 and the member data 24 corresponding to the disabled, elders, and children swimmers 6. The normal membership unit 232 records the face information 13 and the member data 24 corresponding to the normal swimmers 6. In an embodiment of the present invention, the disabled swimmers 6 have the corresponding member data 24 categorized under handicapped personnel. The elder swimmers 6 have the corresponding member data 24 categorized under personnel whose age is at least 65 years old. The children swimmers 6 have the corresponding member data 24 categorized under personnel whose age is under 5 years old.

Figure 4:
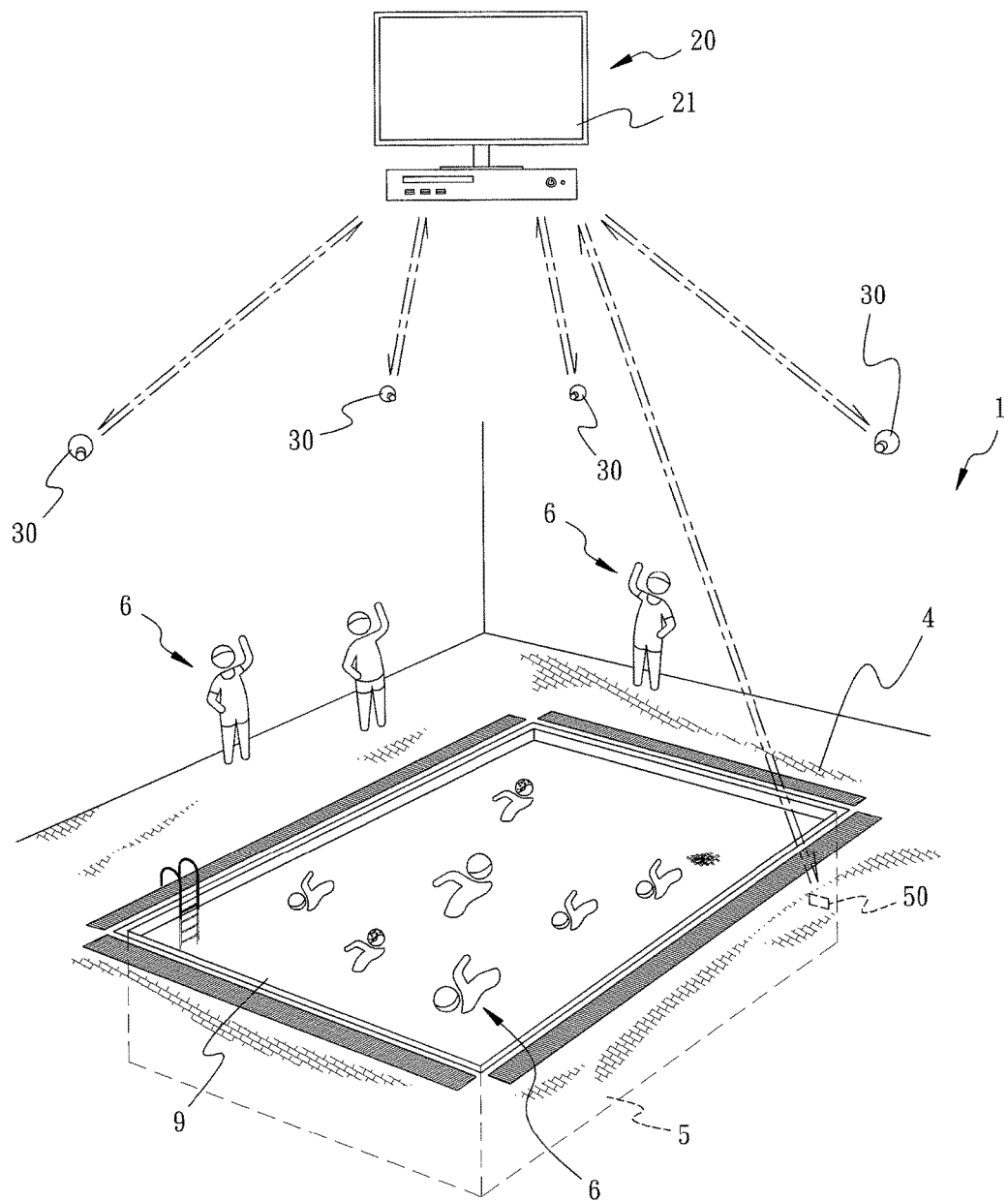
FIG. 4 is a schematic view illustrating the application of the camera identification monitoring module and the environment monitoring module of the system.
Figure 5:
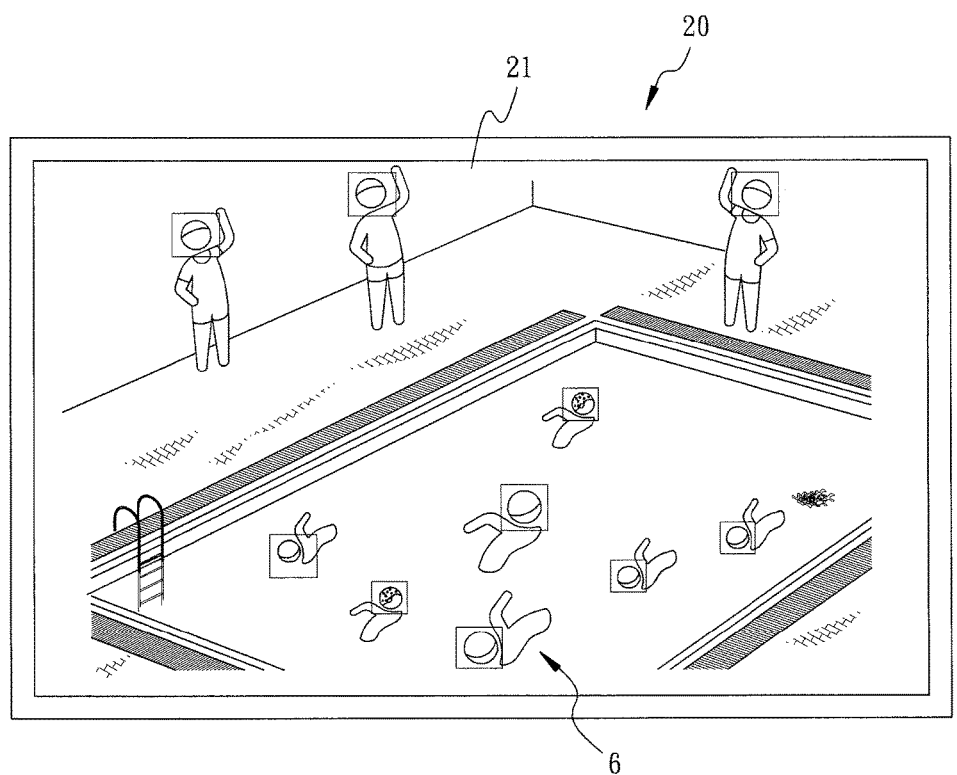
FIG. 5 is a schematic view illustrating the application of the camera identification monitoring module displayed on the operation interface of the terminal controller.

The camera identification monitoring module 30 is coupled with the terminal controller 20, wherein the terminal controller 20 and the camera identification monitoring module 30 are coupled in a cable connection or wireless connection manner. In an embodiment of the present invention, the terminal controller 20 and the camera identification monitoring module 30 are wirelessly connected; also, the camera identification monitoring module 30 is disposed around the facility environment 4 of the swimming pool area 1. Thus, a plurality of camera identification monitoring module 30 are disposed around the facility environment 4 of the swimming pool area 1, as shown by FIG. 4.

The camera identification monitoring module 30 includes a second camera 31, a second processing unit 32, and a positioning unit 33. The second camera 31 captures the face of the swimmers 6 at the facility environment 4 of the swimming pool area 1. The second processing unit 32, based on the images captured by the second camera 31, tracks the swimmers 6 according to the face information 13 stored in the corresponding membership module 23. According to the member data 24 corresponding to the tracked face information 13, the second processing unit 32 identifies the activity of the swimmers 6 corresponding to the face information 13. When the second processing unit 32 tracks the face information 13, the tracked face information 13 is able to be disposed on the operation interface 21.

Furthermore, the second processing unit 32 of each camera identification monitoring module 30 sets up a time duration value according to the member data 24 of the membership module 23. When the camera identification monitoring module 30 fails to track a particular face information 13 in the time duration, the swimmer 6 corresponding to the particular face information 13 is deemed as being in an accident event. The second processing unit 32 of the camera identification monitoring module 30 sets different time duration value according to the member data 24 of the membership module 23. For example, when the age of a swimmer 6 in the member data 24 is recorded as 24 years old, the corresponding time duration value is set at 1 minute. When the age of a swimmer 6 is recorded as 70 years old, the corresponding time duration value is set at 40 seconds.

Figure 2:
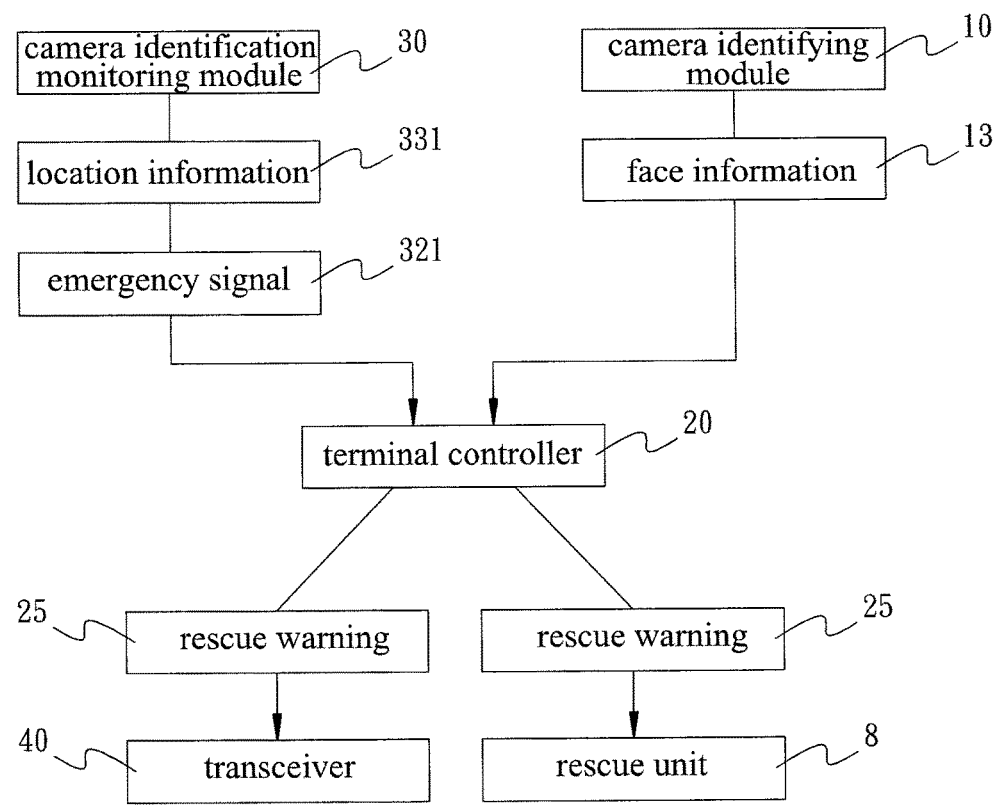
FIG. 2 is a block diagram illustrating the structural connection of the system activated upon accident occurrence.

When the swimmer 6 of the corresponding to the face information 13 is in an accident event, the second processing unit 32 immediately generates an emergency signal 321, and the positioning unit 33 generates a location information 331 corresponding to the emergency signal 321, wherein the second processing unit 32 and the positioning unit 33 sends the emergency signal 321 and the location information 331 to the terminal controller 20, such that the terminal controller 20 sends a rescue warning 25 to be displayed on the operation interface 21. The rescue warning 25 includes the location information 331 and the face information 13 of the rescue-needed swimmer 6, and the rescue warning 25 is presented in an image and sound or light simultaneously, as shown by FIG. 1, FIG. 2, and FIG. 4.

In an embodiment of the present invention, the second processing unit 32 of the camera identification monitoring module 30 reads and tracks the face information 13 in the special membership unit 231, and identifies if the swimmer 6 is in an accident event according to the member data 24 corresponding to the face information 13 recorded in the special membership unit 231. Therefore, the camera identification monitoring module 30 is able to particularly track the face information 13 stored in the special membership unit 231, so as to improve the safety surveillance upon the special swimmers 6, and accurately identify if the special swimmers 6 are in an accident event according to various statuses of the special swimmers 6.

For a further example, each camera identification monitoring module 30 in the facility environment 4 of the swimming pool area 1 tracks the face information 13. When the member data 24 of the tracked face information 13 refers to an elder swimmer 6 whose age is above 65 years old, the second processing unit 32 of each camera identification monitoring module 30 sets up a time duration value at 40 seconds, and the activity of such tracked face information 13 is predetermined to be at a slower rate. Thus, when the elder swimmer 6 stays at the same location for a longer time duration or moves with a relatively slow speed, and at least one camera identification monitoring module 30 is able to track the face information 13 of the elder swimmer 6, the emergency signal 321 will not be triggered. In contrast, when all the camera identification monitoring modules 30 at the area around the elder swimmer 6 fail to track the face information 13 of the elder swimmer 6 for a time duration longer than the predetermined time duration value, the elder swimmer 6 is deemed as being in an accident event, and the emergency signal 321 is triggered to be sent.

In another embodiment of the present invention, a lifeguard in the swimming pool area 1 wears a transceiver 40 which is wirelessly and signally connected with the communication module 22, wherein the transceiver 40 is allowed to be a wireless walkie-talkie or an intelligent mobile device. When an accident event occurs, the emergency signal 321 of the second processing unit 32 and the location information 331 of the positioning unit 33 are sent to the terminal controller 20. The rescue warning 25 sent by the terminal controller 20 is sent to the transceiver 40 through the communication module 22. The lifeguard in the swimming pool area 1 is allowed to efficiently recognize the location and the situation of the accident event according to the face information 13, member data 24, and the location information 331 in the rescue warning 25, achieving an efficient rescue function.

In another embodiment of the present invention, the communication module 22 and the rescue unit 8 are wirelessly and signally connected. In the embodiment, the rescue unit 8 refers to a hospital, and the communication module 22 is wirelessly and signally connected with the rescue unit 8 through the internet. When an accident event occurs, the emergency signal 321 of the second processing unit 32 and the location information 331 of the positioning unit 33 are sent to the terminal controller 20. The rescue warning 25 sent by the terminal controller 20 is sent to the rescue unit 8 through the communication module 22. Upon receiving the rescue warning 25, the rescue unit 8 is able to immediately send out an ambulance, thus improving the rescue efficiency.

In another embodiment of the present invention, as shown by FIG. 1 and FIG. 2, when an accident event occurs, the emergency signal 321 of the second processing unit 32 and the location information 331 of the positioning unit 33 are sent to the terminal controller 20. The rescue warning 25 sent by the terminal controller 20 is sent to the transceiver 40 and the rescue unit 8 through the communication module 22, such that the lifeguard is able to conduct a primary rescue action upon the rescue needed swimmer 6. Next, when the rescue unit 8 reaches the swimming pool area 1, the medical staff conduct a further rescue action upon the swimmer 6 and transport the swimmer 6 to the rescue unit 8, thus enhancing the efficiency and outcome of the rescue.

Therefore, the present invention records the face information 13 of the swimmers 6 through the camera identifying module 10, and tracks the face information 13 of the swimmers 6 in the swimming pool area 1 all the time through the camera identification monitoring module 30. When the swimmer 6 of corresponding face information 13 is deemed as being in an accident event, the terminal controller immediately sends the rescue warning 25, so as to improve the rescue efficiency and the safety of the swimming pool area 1. Also, the positioning unit 33 is able to efficiently provide a rescue-needed location, such that the swimmer 6 needing rescue and the location thereof is recognized effectively, thus enhancing the rescue efficiency.

An environment monitoring module 50 is coupled with an environment recording module 26 of the terminal controller 20 and disposed at the swimming pool 5 in the swimming pool area 1, as shown by FIG. 1 and FIG. 4. The environment monitoring module 50 is applied for detecting the liquid 9 in the swimming pool 5 and generating a liquid quality information. In an embodiment of the present invention, the liquid 9 refers to water. Also, the liquid 9 is allowed to be other similar material. The liquid quality information includes information related to the temperature, water quality, and bacteria count.

Also, the environment monitoring module 50 sends the liquid quality information to the environment recording module 26 of the terminal controller 20, such that the liquid quality information is recorded in the environment recording module 26. The environment recording module 26 analyzes the liquid quality information into a diagram which is displayed on the operation interface 21. The keeper 7 of the swimming pool area 1 is allowed to effectively and easily acknowledge the current quality status of the liquid 9. The environment recording module 26 is provided with a warning scope value, such that when the liquid quality information received by the environment recording module 26 exceeds the warning scope value, the environment recording module 26 sends out a notification signal which is displayed on the operation interface 21, thereby notifying the keeper 7 of the swimming pool area 1 that the liquid 9 in the swimming pool 5 needs to be replaced in order to maintain the high quality of the liquid 9.

For a particular example, when the temperature of the liquid 9 in the warning scope value set by the environment recording module 26 is 36 Celsius degrees, and the current temperature of the liquid 9 in the liquid quality information provided by the environment monitoring module 50 to the environment recording module 26 is 30 Celsius degrees, the keeper 7 of the swimming pool area 1 is aware that the liquid 9 needs to be heated until the temperature of the liquid 9 falls in the warning scope value. Therefore, the quality of the liquid 9 in the swimming pool 5 is under control, thus decreasing the damaged caused by low quality liquid upon the swimmers 6 and improving the quality of the swimming pool 5.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A swimming pool safety surveillance system, comprising:
   a camera identifying module disposed at a swimming pool area for detecting a face of a swimmer and generating a corresponding face information;
   a terminal controller coupled with the camera identifying module for storing the face information; and
   a camera identification monitoring module coupled with the terminal controller and disposed around a facility environment of the swimming pool area for tracking the face information,
   wherein when the swimmer corresponding to the face information is in an accident event, the camera identification monitoring module generates an emergency signal which is sent to the terminal controller, such that the terminal controller sends out a rescue warning.

2. The swimming pool safety surveillance system of claim 1, wherein the camera identification module includes a positioning unit, the positioning unit generating a location information corresponding to the emergency signal and sending the location information to the terminal controller, the rescue warning including the location information and the face information of the swimmer which is in the accident event.

3. The swimming pool safety surveillance system of claim 1, wherein the terminal controller includes a membership module for recording the face information and generating a member data corresponding to the face information; the membership module includes a special membership unit and a normal membership unit; the special membership unit records the face information and the member data corresponding to the swimmer having the corresponding member data categorized under handicapped personnel; the normal membership unit records the face information and the member data corresponding the swimmer that is not disabled.

4. The swimming pool safety surveillance system of claim 1, wherein the terminal controller includes a membership module for recording the face information and establishing a member data corresponding to the face information; the membership module includes a special membership unit for recording the face information and member data corresponding to children and elder swimmers.

5. The swimming pool safety surveillance system of claim 3, wherein the camera identification monitoring module reads and tracks the face information in the special membership unit, such that the camera identification monitoring module identifies if the swimmer corresponding to the face information in the special membership unit is in an accident event according to the member data corresponding to the face information of the special membership unit.

6. The swimming pool safety surveillance system of claim 4, wherein the camera identification monitoring module reads and tracks the face information in the special membership unit, such that the camera identification monitoring module identifies if the swimmer corresponding to the face information in the special membership unit is in an accident event according to the member data corresponding to the face information of the special membership unit.

7. The swimming pool safety surveillance system of claim 5, wherein a plurality of the camera identification monitoring modules are included, and each camera identification monitoring module sets up a time duration value according to the member data in the membership module; when the camera identification monitoring module fails to track a particular face information in the predetermined time duration, the swimmer corresponding to the particular face information is deemed as being in an accident event.

8. The swimming pool safety surveillance system of claim 6, wherein a plurality of the camera identification monitoring modules are included, and each camera identification monitoring module sets up a time duration value according to the member data in the membership module; when the camera identification monitoring module fails to track a particular face information in the predetermined time duration, the swimmer corresponding to the particular face information is deemed as being in an accident event.

9. The swimming pool safety surveillance system of claim 1, wherein a lifeguard in the swimming pool area wears a transceiver, and the terminal controller further includes a communication module, such that the transceiver is wirelessly and signally connected with the communication module, and the communication modules sends the rescue warning to the transceiver.

10. The swimming pool safety surveillance system of claim 2, wherein a lifeguard in the swimming pool area wears a transceiver, and the terminal controller further includes a communication module, such that the transceiver is wirelessly and signally connected with the communication module, and the communication modules sends the rescue warning to the transceiver.

11. The swimming pool safety surveillance system of claim 1, wherein the terminal controller includes a communication module, and the communication module is wirelessly and signally connected with a rescue unit, such that the communication module sends the rescue warning to the rescue unit.

12. The swimming pool safety surveillance system of claim 2, wherein the terminal controller includes a communication module, and the communication module is wirelessly and signally connected with a rescue unit, such that the communication module sends the rescue warning to the rescue unit.

13. The swimming pool safety surveillance system of claim 1, further comprising an environment monitoring module which is coupled with the terminal controller and disposed in the swimming pool of the swimming pool area for detecting a liquid quality information, such that the environment monitoring module sends the liquid quality information to the terminal controller.

14. The swimming pool safety surveillance system of claim 13, wherein the terminal controller includes an environment recording module, and the liquid quality information is recorded in the environment recording module; the environment recording module stores a warning scope value, such that when the liquid quality information exceeds beyond the warning scope value, a notification signal is sent out; the terminal controller is coupled with an operation interface, such that the environment recording module analyzes the liquid quality information into a diagram which is displayed on the operation interface.

\* \* \* \* \*